(12) United States Patent
Cobb

(10) Patent No.: US 11,187,677 B1
(45) Date of Patent: Nov. 30, 2021

(54) COMBINED ULTRASONIC AND THERMOMECHANICAL PROPERTY MEASUREMENT

(71) Applicant: Wesley Nelson Cobb, Denver, CO (US)

(72) Inventor: Wesley Nelson Cobb, Denver, CO (US)

( * ) Notice: Subject to any disclaimer, the term of this patent is extended or adjusted under 35 U.S.C. 154(b) by 0 days.

(21) Appl. No.: 17/204,839

(22) Filed: Mar. 17, 2021

(51) Int. Cl.
G01N 29/24 (2006.01)
G01N 29/11 (2006.01)
G01N 25/16 (2006.01)
G01N 29/07 (2006.01)

(52) U.S. Cl.
CPC ............ *G01N 29/07* (2013.01); *G01N 25/16* (2013.01); *G01N 29/11* (2013.01); *G01N 29/2437* (2013.01); *G01N 2291/011* (2013.01); *G01N 2291/015* (2013.01); *G01N 2291/023* (2013.01); *G01N 2291/101* (2013.01)

(58) Field of Classification Search
CPC ........ G01N 29/07; G01N 29/11; G01N 25/16; G01N 29/2437; G01N 2291/015; G01N 2291/023; G01N 2291/101; G01N 2291/011
USPC .......................................................... 73/597
See application file for complete search history.

(56) References Cited

U.S. PATENT DOCUMENTS

| | | | |
|---|---|---|---|
| 3,864,961 A * | 2/1975 | Cessna, Jr. ............ | G01N 11/00 73/54.23 |
| 4,754,645 A | 7/1988 | Piche et al. | |
| 4,896,973 A * | 1/1990 | Hill ........................ | G01N 25/00 374/55 |
| 5,433,112 A | 7/1995 | Piche et al. | |
| 7,124,635 B2 * | 10/2006 | Kushibiki .............. | G01N 25/16 73/602 |
| 7,353,709 B2 | 4/2008 | Kruger et al. | |
| 10,794,870 B2 * | 10/2020 | Balasubramaniam ...................... | G01N 29/228 |

(Continued)

OTHER PUBLICATIONS

Ultrasonic characterizaton of polymer viscoelasticity, application to polystrene, Makromol. Chern. Symp. 23, 121-137, Massines et al.. (Year: 1989).*

(Continued)

*Primary Examiner* — Jacques M Saint Surin
(74) *Attorney, Agent, or Firm* — Law Office of Mark Levy

(57) ABSTRACT

Apparatus and method of characterizing a material. A sample of a material to be characterized is placed into a thermomechanical analyzer (TMA) instrument, the material sample being a cylindrically- or rectangularly-shaped pellet having parallel top and bottom faces. The TMA has a measurement probe with a single buffer rod intermediate an ultrasound transducer and the top face of the material sample. Ultrasound waves are transmitted through the buffer rod and the top face of the material sample. Signals from the ultrasound waves passing through the material sample are received using a receiving sensor below the bottom face of the material sample. The TMA instrument is then used to control the temperature and forces applied to the material sample and to measure changing length of the material sample. Finally, the ultrasonic attenuation and velocity properties of the material are calculated as a function of the material sample length measurement and received ultrasound signals.

19 Claims, 10 Drawing Sheets

(56) References Cited

U.S. PATENT DOCUMENTS

2002/0038160 A1    3/2002  Maynard et al.
2016/0153938 A1*  6/2016  Balasubramaniam ........................
                                                G01N 29/032
                                                      73/579

OTHER PUBLICATIONS

High Temperature Resonant Ultrasound Spectroscopy: A Review, G. Li and J. R. Gladden, Department of Physics and Astronomy, National Center for Physical Acoustics, The University of Mississippi, MS 38677, USA. (Year: 2010).*

Tadaoki Ii et al., "Thermomechanical and Ultrasonic Properties of High-Modulus Aromatic Polyamide Fibers", Macromolecules 1986, vol. 19, pp. 1809-1814.

F. Micelli et al. "Characterization of the kinetic behavior of resin modifed Glass-ionomer cement . . . ", Journal Of Materials Science: Materials In Medicine 12 (2001) p. 151-156.

* cited by examiner

COMBINED ULTRASONIC AND THERMOMECHANICAL PROPERTY MEASUREMENT

FIELD OF THE INVENTION

The present invention relates to the measurement of material properties and, more particularly, to measuring material properties, including the ultrasonic attenuation, velocity properties, and thermomechanical properties of a sample, using both ultrasonic waves and mechanical deformations.

BACKGROUND OF THE INVENTION

Ultrasonic spectroscopy (USS) and thermomechanical analysis (TMA) are two analytical methods for determining key physical and chemical properties of a sample material. The samples are typically in the form of a cylinder or a sheet with a thickness of several millimeters.

Many materials undergo changes of their thermomechanical properties during heating or cooling. For example, phase changes, crystallization, sintering steps or softening can occur in addition to thermal expansion. Thermomechanical Analysis is used to characterize linear expansion, glass transitions, and softening points of materials by applying a constant force to a sample while varying the temperature.

The solid sample is often contained within a fixture which holds the ultrasound transducer elements in direct contact. Physical contact between the element and sample must be maintained in order to allow the waves to enter and exit the sample. For expansion measurements, a probe rests on a sample on a stage with minimal downward pressure. For compression measurements, the probe rod applies a known force and the displacement is recorded as temperature changes. It is important to note that TMA is a laboratory analytical technique for characterizing prepared material samples. It is not intended for on-line measurement of changing (e.g., flowing) materials in a process as described by Maynard, et. al. in U.S. published patent application no. 2002/0038160 or by Piche, et al. in U.S. Pat. No. 5,433,112.

Ultrasonic spectroscopy measures two material characteristics: the attenuation and the velocity of the waves. Attenuation is determined by the energy losses during propagation of ultrasonic waves which is primarily caused by absorption and scattering processes. Ultrasonic velocity is determined by the density and the elasticity of the medium. The velocity is extremely sensitive to the molecular organization and inter-molecular interactions in the sample. For this reason, velocity measurements can be used in the analysis of a broad range of molecular processes. However, high resolution measurements are typically required, and are difficult to obtain because of the difficulty of controlling the temperature and thickness of the sample.

The primary application of USS is in research, such as the measurement of chemical reactions and particle sizing in liquid emulsions and suspensions. However, USS applications have been made on solid and semi-solid samples. Both USS and TMA analyses can provide valuable insight into the composition, structure, production quality or application information for various materials. Typical applications include plastics, paints and dyes, composite materials, adhesives, films and fibers, ceramics, glass, metals, composites and amorphous materials.

The USS method suffers from several difficulties. Ultrasound spectroscopy can be carried out only while the sample is maintained in a constant environment. If the forces on the sample or the material temperature change, then the sample length (L) will change in an unknown way. The ultrasound spectroscopy reading will no longer be correct because it depends on a known sample length for the attenuation and velocity measurements. Moreover, if the sample contracts, there may be complete loss of the received signal due to loss of wave coupling from the ultrasound sensor into the sample.

Ultrasonic techniques using buffer rods to conduct the waves into the sample are known. U.S. Pat. No. 4,754,645 describes an apparatus for measuring the viscoelastic properties of polymers over a wide temperature and pressure range. The liquid or semi-solid polymer samples are held in a piston chamber formed by the ends of two buffer rods. Ultrasonic waves are sent through the upper and lower buffer rods to ensonify the sample. A hydraulic press attached to the buffer rods is used to pressurize the sample inside the piston chamber. Heating mantles on the outside of the buffer rods control the temperature of the plastic sample.

Ultrasonic sensors contact the ends of the buffer rods to send waves through the stretched fiber as it is heated in an oven. Only the fiber is heated because the ends of the buffer rods and ultrasonic sensors are not in the oven. The elastic properties of the fiber strand are determined from the travel time and velocity of the waves through the fiber.

Thus, buffer rods can be used to isolate the temperature-sensitive ultrasonic sensors from the hot sample in the oven. However, use of these rods complicate the measurement because of wave energy losses in the rods and the need to maintain alignment and coupling of the rods and alignment to the sample.

All the techniques described above suffer from a common drawback. The complex apparatus needed to make accurate measurements is very expensive and time consuming to design and construct. This apparatus must support the material sample and assure that good coupling of the ultrasound waves is maintained throughout the measurement. This has prevented more frequent use of ultrasound to characterize materials as a function of temperature.

DESCRIPTION OF RELATED ART

U.S. Pat. No. 4,754,645 for ULTRASONIC CHARACTERIZATION OF POLYMERS UNDER SIMULATED PROCESSING CONDITIONS issued to Piche, et al. on Jul. 5, 1988 discloses a method and an apparatus for ultrasonically characterizing polymer materials under simulated processing conditions. A sample of a polymer is held in confinement between two axially aligned buffer rods having opposed parallel end surfaces spaced from one another to define a gap filled with the polymer sample, the polymer sample being acoustically coupled to the opposed end surfaces of the buffer rods. Ultrasonic waves are transmitted through one of the buffer rods in a direction toward the polymer sample for interaction therewith, and the polymer sample is subjected to controlled temperature or pressure variations over a predetermined period of time, the variation in temperature or pressure being effected via the buffer rods. Phase and amplitude variations of the ultrasonic waves having interacted with the polymer sample are continuously monitored as well as thickness variations of the polymer sample, over the predetermined period of time, to obtain data comprising phase, amplitude and thickness values measured as a function of temperature or pressure and time, which are then processed to derive characteristic parameters providing both a thermodynamic and viscoelastic characterization of the polymer.

U.S. Pat. No. 5,433,112 for ULTRASONIC CHARACTERIZATION OF POLYMER MELTS UNDER PROCESSING CONDITIONS issued to Piche, et al. on Jul. 18, 1995 discloses a method and apparatus for ultrasonically characterizing a polymer melt flowing in a predetermined direction between two opposed parallel surfaces spaced from one another to define a gap filled with polymer. Ultrasonic pulses are propagated through the polymer melt between the two surfaces in a direction normal to the direction of flow for interaction with the polymer, the ultrasonic pulses having a duration such as to prevent successive echoes from overlapping with one another while reverberating between the two surfaces. The time delay between two echoes exiting from the polymer melt and generated from each pulse having interacted with the polymer is continuously monitored while simultaneously monitoring amplitude variations of the two echoes, to provide output signals representative of ultrasonic velocity and attenuation in the polymer melt. These output signals are processed to obtain data comprising ultrasonic velocity and attenuation values measured simultaneously as a function of time. The data is then processed to derive quantitative information relating to viscoelastic properties, structure or composition of the polymer, which can be used as input data in a closed-loop process control system.

U.S. Pat. No. 7,353,709 for METHOD AND SYSTEM FOR DETERMINING MATERIAL PROPERTIES USING ULTRASONIC ATTENUATION issued to Kurger, et al. on Apr. 8, 2008 discloses a method and system for determining a property of an object by measuring ultrasonic attenuation. A measured ultrasonic interaction signal of the object is compared with a reference signal produced using the same generation and detection setup, but using a reference part. The reference ultrasonic signal has low attenuation, and exhibits equivalent diffraction properties as the object, with respect to a broadband ultrasonic pulse. The difference is attributable to the attenuation of the object. The attenuation as a function of frequency, the attenuation spectrum, is fitted to a model to obtain a parameter useful for identifying one of the many properties of an object that varies with ultrasonic attenuation.

SUMMARY OF THE INVENTION

The present invention uses the inherent capabilities of a typical thermomechanical analysis instrument to allow USS measurements on samples undergoing changes in applied forces or temperature. By adding USS sensing to an existing TMA apparatus, the USS is carried out at the same time as the TMA measurement. In addition, by using a typical TMA instrument, the inventive apparatus can measure ultrasonic waves traveling through a pressed pellet of material, rather than through a thin strand or containerized sample. The pellet can be any shape including cylindrical or rectangular as long as the ends have parallel faces and the pellet fits onto the sample platform of the TMA instrument. Thus, the invention provides a way of simultaneously determining the ultrasonic attenuation and velocity properties as well as the thermomechanical and viscoelastic properties of a solid or semi-solid material In accordance with the invention, there is provided a method of characterizing a material. A sample of a material to be characterized is placed into a thermomechanical analyzer (TMA) instrument, the material sample being a cylindrically- or rectangularly-shaped pellet having parallel top and bottom faces. The TMA has a measurement probe with a single buffer rod intermediate an ultrasound transducer and the top face of the material sample. Ultrasound waves are transmitted through the buffer rod and the top face of the material sample. Signals from the ultrasound waves passing through the material sample are received using a receiving sensor below the bottom face of the material sample. The TMA instrument is then used to control the temperature and forces applied to the material sample and to measure changing length of the material sample. Finally, the ultrasonic attenuation and velocity properties of the material are calculated as a function of the material sample length measurement and received ultrasound signals.

An alternative embodiment of the invention includes an apparatus for carrying out the measurements described above. The apparatus consists of means for measuring ultrasound attenuation and velocity at multiple frequencies. The waves are coupled to the material sample using a buffer rod that contacts the top of the material sample. The apparatus includes a typical TMA instrument to support the pellet on the sample platform, to measure sample thickness, to apply forces, and to control the temperature of the sample. In this way, no additional work is required for sample preparation other than that normally needed for the TMA instrument.

Those skilled in the art readily understand the wide range of potential applications for enhanced material characterization of materials in various industries such as food, pharmaceuticals, chemicals, petroleum, waste treatment, and paper. Material composition is an important indicator of the composition and quality of many industrial processes.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

Thermomechanical analysis (TMA) is a technique that measures changes in sample size as a function of temperature, time and load. This measurement can detect a change in size from expansion or contraction of the sample as well as a softening or deformation of the sample.

Figure 1:
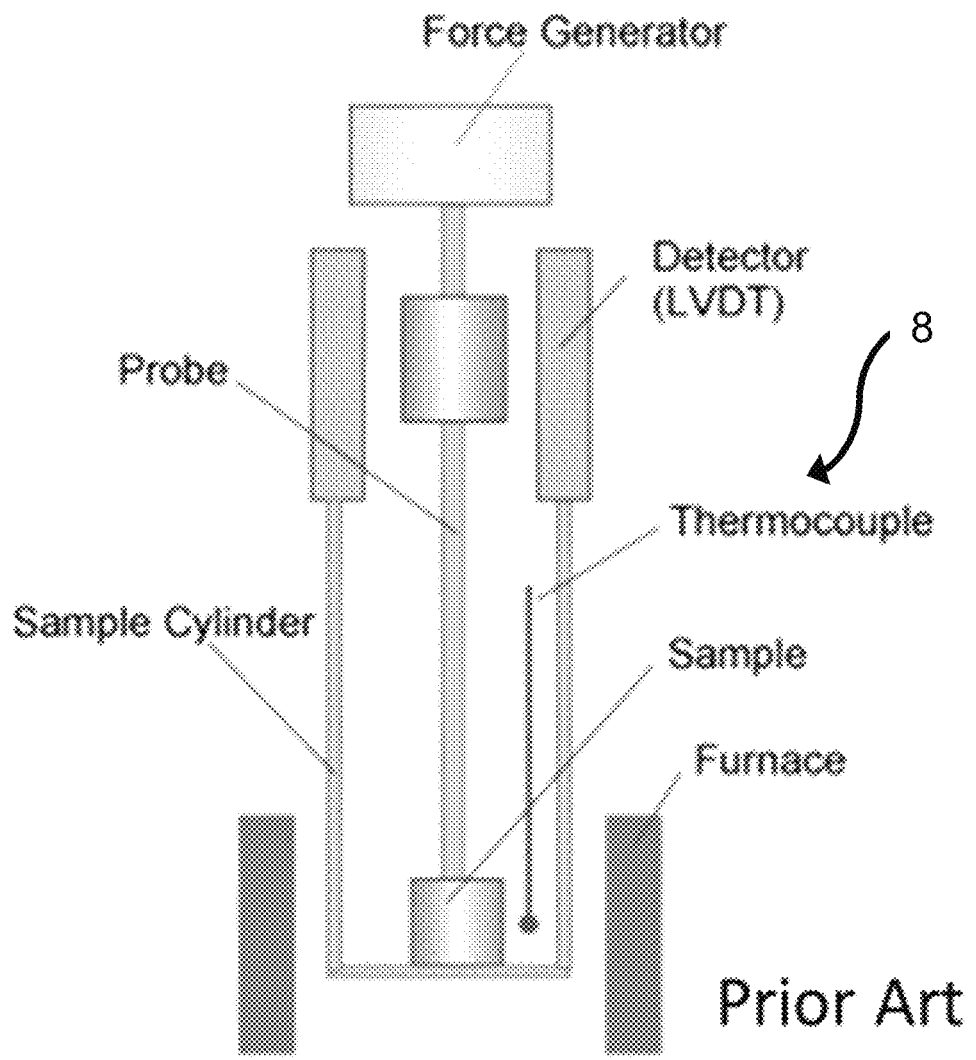
FIG. 1 is a schematic illustration of the working components of a typical TMA Instrument of the prior art.

Referring now to FIG. 1, there is shown a schematic illustration of a typical TMA instrument 8 of the prior art. A sample 10 is inserted into a furnace 12 and is touched by a probe 14 which is connected to a length detector 16 and a force generator 18. Probe 14 is a quartz rod used to measure the deformation of sample 10 as a compression force is applied. A thermocouple 20 for temperature measurement is located proximate sample 10 inside a sample cylinder 22. In operation, the temperature of sample 10 is changed in furnace 12 while applying a force thereunto from force generator 18 via probe 14. The sample deformation with changing temperature is measured as probe 14 is displaced by length detector 16. Length detector 16 comprises a linear variable differential transformer (LVDT) sensor.

An alternative configuration of common TMA instruments has an inverted U-shaped quartz rod which touches the top of the sample. In this way, the force and displacement sensors can be mounted below sample 10 at the opposing end of probe 14, providing certain advantages.

Figure 2:
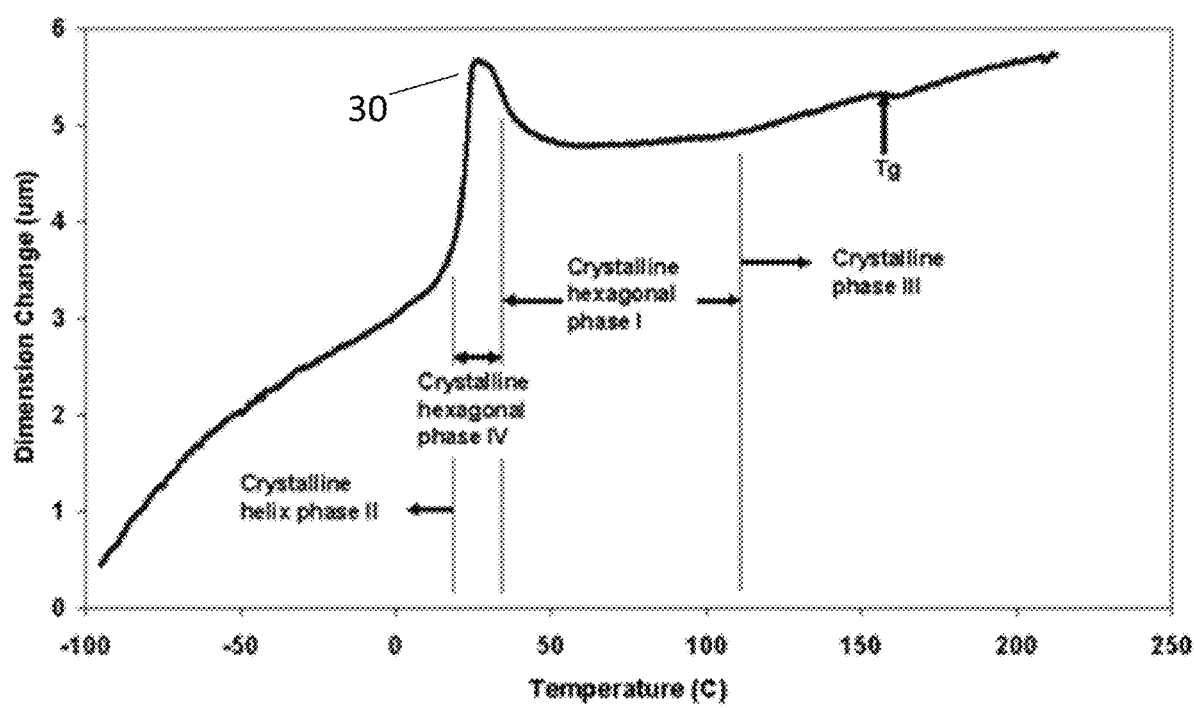
FIG. 2 shows a sample TMA output reading including changes in sample length during temperature changes of a TEFLON® material sample.

As an example of a TMA measurement, FIG. 2 is a sample TMA output reading showing the thermal expansion of a TEFLON® powder material with a high degree of crystallization. These materials were examined after pressing them into sheets. The sheet thickness was measured from 100° C. to 200° C. using a ramp rate of 4° C./min. The TEFLON® material exhibits an extensive crystalline transition at approximately 19° C. due to a transformation of the Phase II helix crystal structure first to the Phase IV hexagonal crystal structure and then to the Phase I hexagonal crystal structure. Large peak 30 created at transition indicates a TEFLON® material which has a substantial crystalline phase and exhibits a drastic dimension change as it changes the crystalline phase. Also shown by TMA 8 is the softening point (Tg or Ts) of the TEFLON® at approximately 160° C. This figure demonstrates the general utility of TMA analysis for the investigation of material properties and changes with temperature.

In one configuration of the present invention, the quartz rod of the TMA instrument 8 is replaced with another probe 14 of similar dimensions that has an imbedded ultrasound element or electromotive acoustic transducer 40 in the preferred embodiment. The modified probe 14 can be made of quartz or any other material that will not be damaged by the high temperatures (>200° C.) of the furnace. In addition, probe 14 is made from a material with a low coefficient of thermal expansion, so that measurements of sample dimensional change are not confounded by dimension changes in probe 14 during TMA operation.

Figure 3:
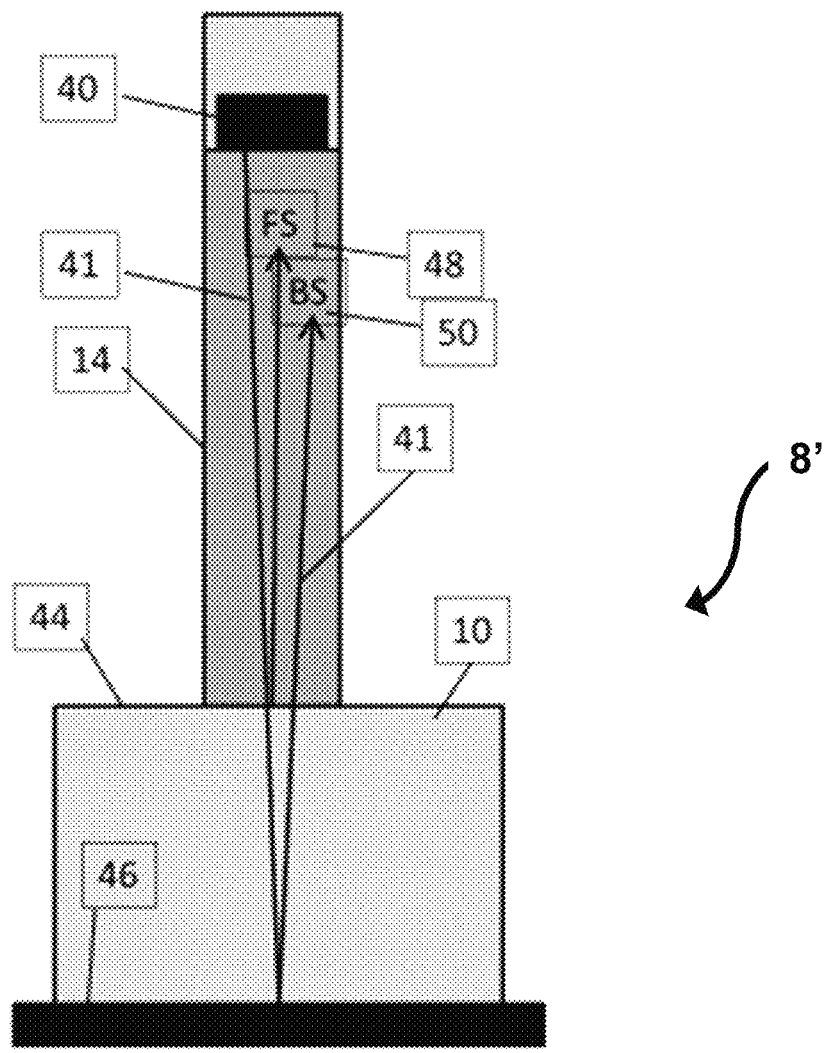
FIG. 3 is a schematic illustration of a USS sensor embedded within a modified quartz rod probe of a typical TMA instrument with the sensor operating in pulse-echo mode.

Referring now also to FIG. 3, there is shown a block diagram of a retrofitted TMA instrument 8' in accordance with the present invention. FIG. 3 is a schematic illustration of a USS sensor 40 embedded within a modified quartz rod probe 14 of a typical TMA instrument 8 (FIG. 1). A piezoelectric 40 or electromagnetic acoustic element is used to generate and receive ultrasound waves. This transducer system operates in pulse-echo mode, where waves 41 are emitted by element 40, reflect from the bottom surface 46 of sample 10 and are received by the same element 40.

Figure 4:
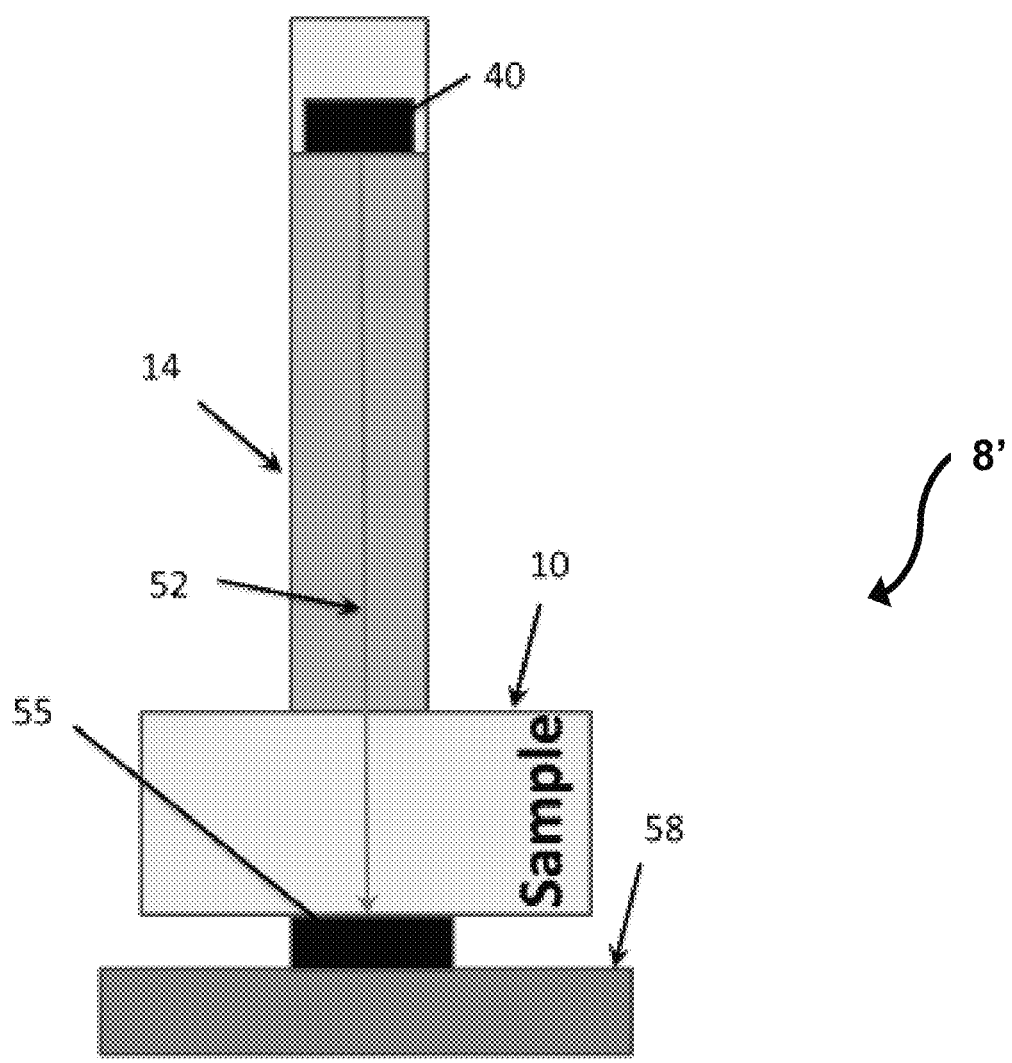
FIG. 4 is a schematic illustration of USS sensors located within a modified quartz rod probe and a sample platform of a typical TMA instrument with the sensor operating in pitch-catch mode.

Alternatively, as shown in FIG. 4, the system can operate in pitch-catch mode by locating a second piezoelectric element 55 on a sample support platform 58. In this mode, waves that have traveled directly through sample 10 are received with this second sensor 55. Waves 52 excited by upper piezoelectric element 40 travel through quartz rod 14 and sample 10 to be received by the lower element 55 under sample 10. This pitch-catch mode provides much stronger and clearer signals than the pulse-echo case. In fact, for many of the polymeric and pressed powder samples studied with this invention, pulse echo signals of sufficient strength were never received. Thus, pulse-echo measurements with a sensor 40 and single buffer rod 14 as shown in FIG. 3 will not work for most samples.

A key feature of this invention is that lower sensor 55 is made of a piezoelectric material that can withstand the high temperatures of a TMA oven. This sensor 55 is made from a crystalize material that has a low coefficient of thermal expansion ($<5.5\times10^{-7}/°$ C.) such as lithium niobate or quartz. In this way, the presence of the lower ultrasonic sensor 55 does not interfere with the correct measurement of sample dimensional change during TMA measurement.

The use of an ultrasonic sensing element 55 below sample 10 and contained inside the oven is a novel, non-obvious way to provide a strong enough signal for pitch-catch measurements. Placing a sensor in the oven creates difficult design problems, but this invention overcomes these problems. A heated sensor was not considered by prior researchers using TMA and dual buffer rods or dual quartz probes.

FIG. 3 shows a TMA 8' with sample arrangement which is almost identical to FIG. 1 of this invention. Earlier designers failed to retrofit a TMA apparatus 8 (FIG. 1) to include ultrasound sensors. Importantly, this would have allowed measurements to be made on the same sample 10, avoiding the possibility that TMA 8 and ultrasound sample materials 10 were not the same. In addition, the expensive design and construction of a separate ultrasound measurement system and sample holder would not have been needed.

The USS system can use either a broad-band pulse excitation or a narrowband tone-burst excitation. For the broad band pulse, the frequency spectrum of the received signal contains energy over a wide band (e.g., 1 to 5 Mhz). In this case the frequency-dependent attenuation readings are calculated at discrete frequencies within this band. Alternatively, for tone-burst excitation, the received spectrum is narrow and contains energy only near the frequency of the burst. In this case, only one attenuation reading need be calculated for each burst frequency. Attenuation values for a range of frequencies are obtained by recording multiple signals as the frequency of the burst is changed over the desired range.

The frequency-dependent attenuation coefficient for the pulse-echo configuration can be calculated as follows:

$$\alpha(f) = \frac{1 \ln|BS(f)|}{2L |FS(f)|} \quad [1]$$

where L is the changing sample length (under the probe) as measured by TMA apparatus 8'. The term FS(f) is the Fourier magnitude spectra of the time-domain pulse FS(t) 48 with sample 10 present on buffer rod as shown in FIG. 3.

Similarly, BS(f) is the Fourier magnitude spectra of the time-domain pulses BS(t) 50.

The reflection coefficient for the reflection from the bottom surface of sample 10 disposed on a hard steel plate 46 is taken to be unity for all frequencies. In addition, two back surface reflections BS can be used instead of one front surface 44 reflection and one back surface 46 reflection. The advantage of the first approach is that some materials may be too attenuative to provide a measurable second back surface echo for this analysis. For the pitch-catch mode illustrated in FIG. 3, FS(f) is the spectrum of the received pulse with the sample in place and BS(f) the spectrum without sample 10 (i.e., the tip of buffer rod 14 touches receiving element 40).

The longitudinal sound velocity can be determined in several ways using the pitch-catch configuration. In this invention, cross-correlation and phase methods are used by applying frequency-domain signal processing techniques. In the cross-correlation method, the time delay $T_o$ between the pulses FS(t) with sample 10 and BS(t) without sample 10 (FIG. 4) is obtained by cross-correlating the pulses with digital signal processing, and the velocity $V_1$ was obtained from $T_o$ and the sample thickness L according to:

$$V = 2\frac{L}{T_o} \quad [2]$$

The sample thickness L changes as the sample is heated in TMA oven 8'. The TMA dimensional change measurement can be used to correct the velocity for this length change.

Velocity determined from cross-correlation of a broad band pulse is essentially a pulse velocity because the entire wave train (containing a broad band of frequencies) is considered in the calculation. Cross-correlation is a preferred method for determining velocity, since it produces accurate velocities even with noisy signals.

Alternatively, for the pitch-catch mode, the velocity can be determined from the change in the time-of-arrival, $T_o$ of the first part of the received signals, with and without sample 10 in place. This $T_o$ is discussed hereinbelow.

Attenuation is a measure of the dissipative energy losses as the wave travels through the material caused by scattering and absorption. The scattering contribution is considerable when the medium is non-homogeneous and contains particles comparable in size to the ultrasonic wavelength, such as voids or semicrystalline polymers. The absorption is related to molecular rearrangements in the polymer structure, such as glass transition, melting and crystallization.

Combined ultrasonic and TMA measurements provide a wealth of information about the elastic properties of a material. The longitudinal velocity of sound $v_l$ is related to the Young's modulus Y (or storage modulus E') as:

$$Y(T) = q * v_l^2(T)$$

where q is the density of the material and $v_l$ and Y change with temperature T. Young's modulus is the slope of the stress-strain curve along a single axis (i.e., longitudinal) in a material.

The Bulk modulus is an extension of Young's modulus to three dimensions. This relation can be used to calculate Bulk modulus B from Young's modulus:

$$B(T) = \frac{Y(T)}{3(1-2v)}$$

where v is the Poisson ratio.

Similarly, the attenuation of sound $A_l$ is related to the loss modulus E" as:

$$E^{uu} = 2qv_l^3 A_l / \omega$$

where ω is the angular frequency (ω=2πf).

In addition to the bulk modulus and loss modulus, the inventive TMA-USS system provides the linear coefficient of thermal expansion as:

$$\alpha_L(T) = (\Delta D_S / \Delta T) / D_S$$

where ΔT is a change in temperature and $\Delta D_S$ is the change in dimension of the sample with temperature as measured by the TMA. Note that $\alpha_L(T)$ is temperature dependent but changes only slightly for most TMA-USS measurement runs. The volume coefficient of thermal expansion $\alpha_V(T)$ can be calculated approximately as:

$$\alpha_V(T) \approx 3\alpha_L(T)$$

Both the volume coefficient of thermal expansion $\alpha_V(T)$ and the Bulk Modulus K(T) are key components of any Equation of State (EOS) for the material. These values, and the isothermal Anderson-Grüneisen parameter, fully define the EOS of the material as a function of temperature. The Anderson-Grüneisen parameter can be calculated from the thermal expansion αV(T) and the Bulk Modulus B(T) as:

$$\delta_T = -\frac{1}{\alpha_{v_p} B_T}\left(\frac{\partial B_T}{\partial T}\right)_p = -\frac{1}{\alpha_{v_p}}\left(\frac{\partial \ln B_T}{\partial T}\right)_p.$$

When B(T) in the above is written in terms of Y(T) only, the term (3-2v) in the definition of B(T) drops out since it is in both the numerator and denominator. Thus, the Poisson ratio need not be known to calculate the Anderson-Grüneisen parameter from the TMA-USS readings. In addition, if the specific heat capacity at constant pressure $C_p$ is known, a different parameter, the Grüneisen parameter γ, can be calculated as:

$$\gamma(T) = \alpha_V(T) v_l^2(T) / C_p$$

This parameter, γ, is critical to the development of many Equations of State for materials.

Thus, relatively straightforward measurements from the combined ultrasound and TMA instrument provide important physical constants that are useful for modeling a materials behavior.

This invention provides both ultrasonic and thermomechanical properties of a sample pellet by retrofitting a TMA instrument 8' to also take ultrasonic measurements.

Figure 5:
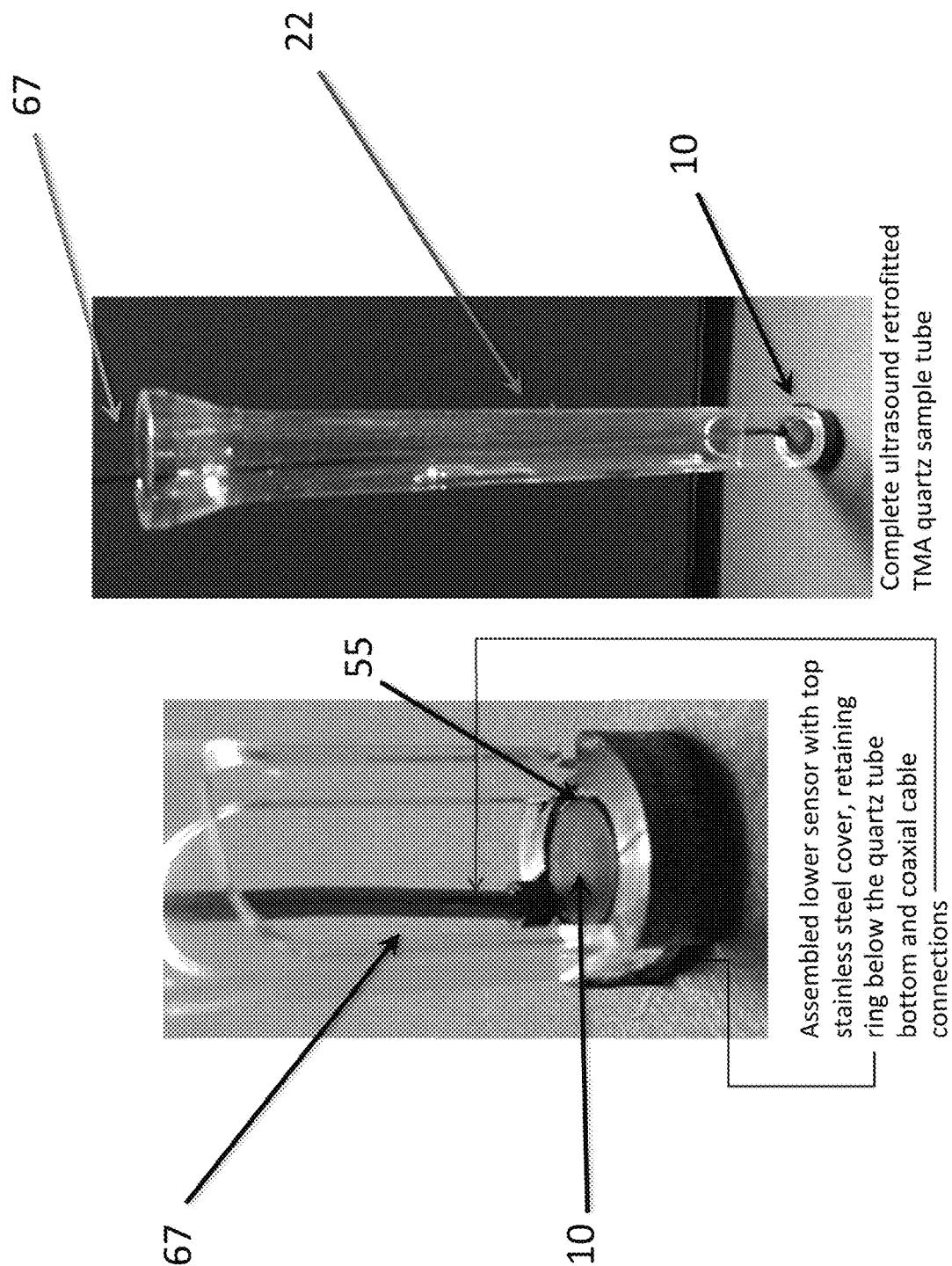
FIG. 5 is a photographic depiction of a lower pitch-catch receiving sensor as retrofitted into the quartz sample tube of an existing TMA instrument.

Referring now to FIG. 5, there are shown photos of the ultrasonic components that have been added to the normal "quartz sample support tube" of a commercial TMA instrument 8 (FIG. 1). Conventionally, a sample 10 to be tested is placed directly on the bottom sample platform 46 of quartz tube 14. For the ultrasonic retrofit of the present invention, sample 10 is placed on top of the receiving ultrasonic sensor 55. Transmitting sensor 40 is connected to rod 14 that touches sample 10 from above. Lower sensor 63 is required in order to make a "pitch-catch" system illustrated in FIG. 4.

Figure 6:
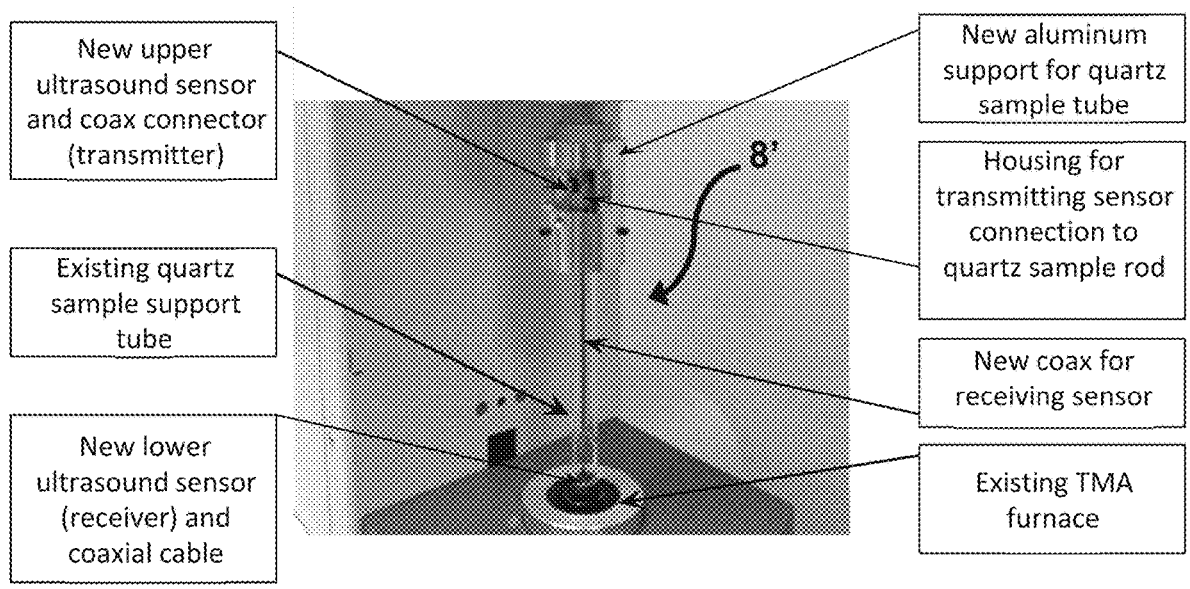
FIG. 6 is a photographic depiction of an existing TMA instrument with retrofitted USS components.

FIG. 6 is a photographic depiction of retrofitted USS-TMA components installed on a commercial TMA instrument 8'. The main feature of this retrofitted system is the two ultrasonic sensors 40, 55. One sensor 40 is in the upper end of a new "sample rod" that conducts ultrasonic waves to the top of sample 10. Electrical connection to sensor 40 is shown as the threaded coax connector mounted on sample rod. The waves emitted by this sensor 40, travel through quartz sample rod 14 and then into sample 10 and are received by the lower ultrasonic sensor 55. The received signal is carried by the high temperature coax 67 back up to sensor housing 40. By measuring the time taken from ultrasound emission to reception through sample 10, changes in the time-of-flight and elasticity of sample 10 can be measured as is well known in the art. TMA instrument 8' is operated in the normal way during the ultrasonic measurements, and all standard TMA measurements are recorded, including starting the TMA measurement by lowering the sample rod 14 to touch the top of the sample 10, followed by recording the displacement of the sample rod 14 during heating of sample 10 in TMA instrument oven 8'.

Figure 7:
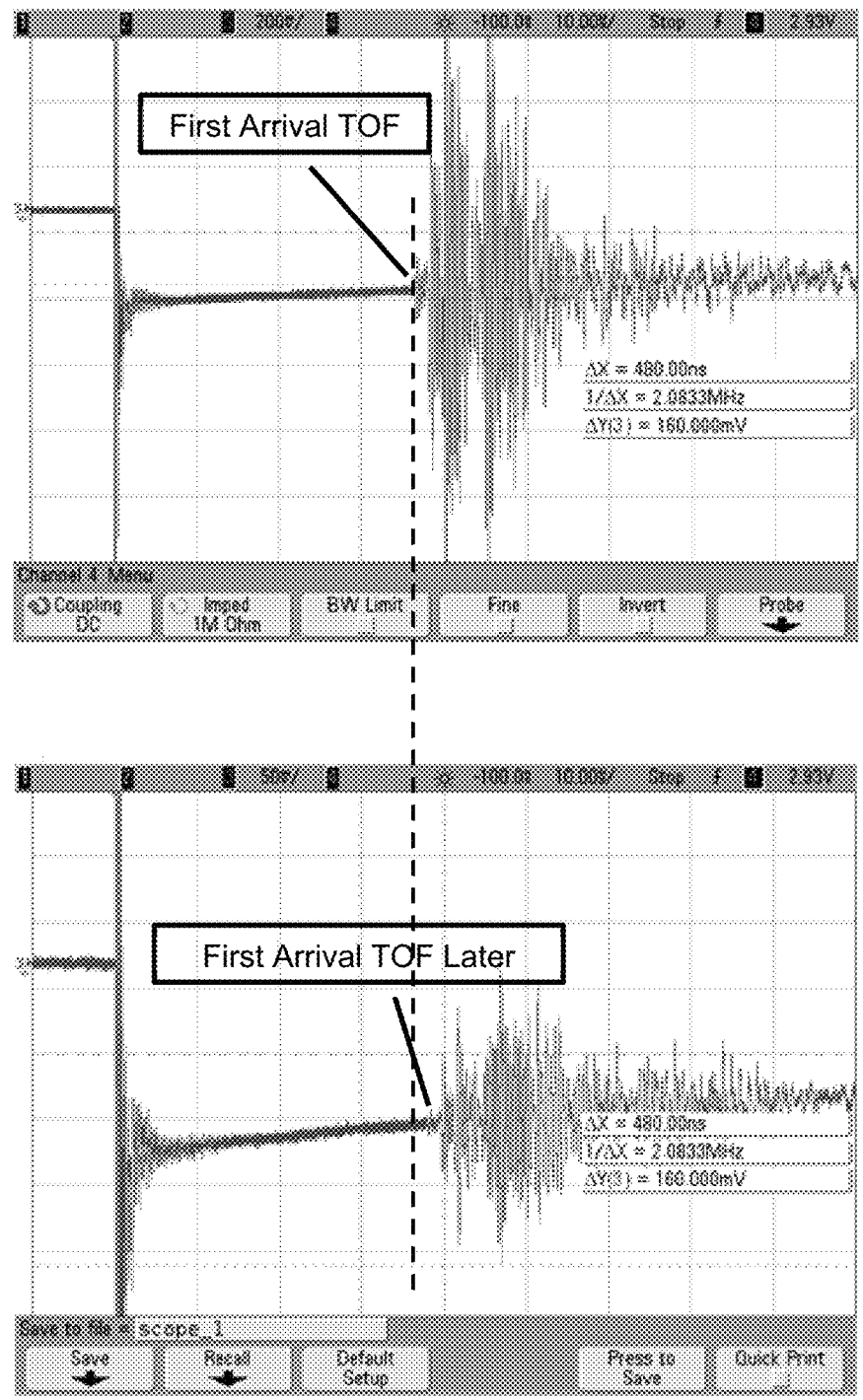
FIG. 7 are plots of signal amplitude versus time for ultrasonic waves transmitted by a sensor attached to a sample probe, traveling through the quartz sample rod and the sample, and received by a lower sensor at the base of a material sample.

As an example of the ultrasonic measurements recorded by retrofitted TMA instrument 8', the two plots in FIG. 7 show measurements of pitch-catch signals traveling through a 200 mm glass sample rod 14 and through two different pressed pellet samples 10 (6 mm dia.). The 3 MHZ waves are received by a receiving ultrasonic sensor 55 located just below the sample. A small amount of high temperature grease, not shown, is applied to couple the waves to pressed pellets 10.

The upper plot shows a time waveform for the 5.5 mm long pellet 10. The first arrival of the signal is marked as the time in microseconds when an abrupt increase in signal level is first detected above the noise level. Similarly, the lower plot shows the time waveform for a longer 8.9 mm pellet 10. The ultrasound wave takes a bit longer to travel through this longer billet 10, as expected. The measurement of Time-of Flight (TOF) is a primary output of the ultrasound retrofitted TMA system 8'. The TOF is used to measure elastic modulus of sample pellets vs. temperature.

These tests demonstrate the feasibility of making the ultrasound measurements in a pitch-catch mode. As noted hereinabove, this mode is more complicated due to the additional, heated sensor element 55. However, this mode allows for a wider range of (highly attenuative) pellet materials to be measured than in the pulse-echo mode.

One common application for commercial TMA instruments is the determination of the material properties of polymer samples. Typically, the glass transition point Tg is determined from the shape of the probe displacement vs. temperature data plot.

Figure 8:
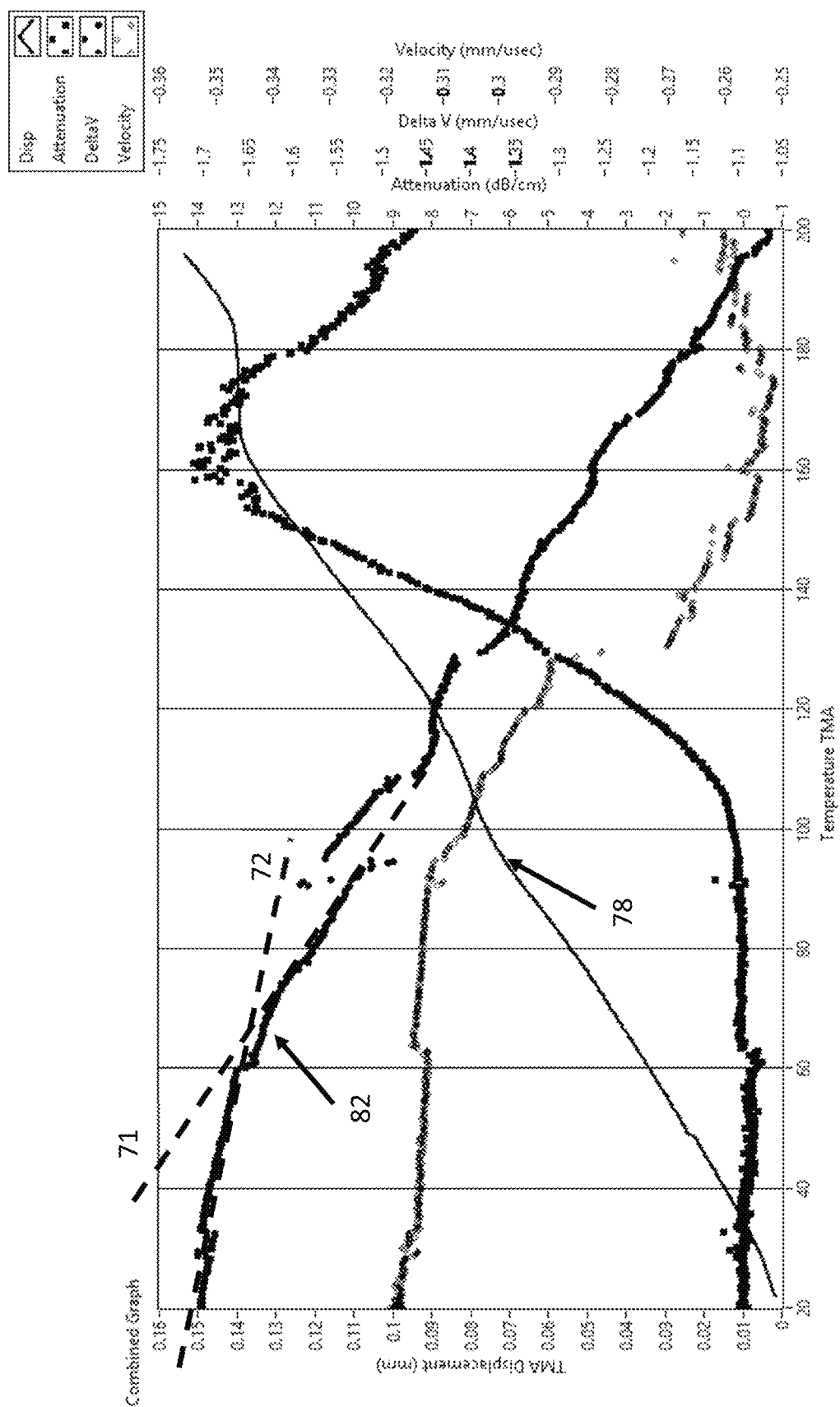
FIG. 8 is a combined plot of a TMA probe displacement with simultaneous USS readings of velocity, delta velocity, and attenuation plotted versus temperature for a PET polymer sample.

As an example of one polymer, FIG. 8 shows data for polyethylene terephthalate (PET) a semicrystalline polymer with a glass transition temperature (Tg) around 72° C. These measurements were taken using the prototype TMA-USS instrument 8' shown in FIG. 6 operating with 3 Mhz ultrasonic sensors 40, 55. The bold width curve is a plot of the displacement of the TMA probe tip due to thermal expansion of the pellet. Although there is a "knee" or curvature of the displacement around 100° C. it is difficult to see much change at a lower temperature. However, the standard width curve for the "delta" velocity (deltaVel) reading shows a sharper knee around 65° C. The deltaVel differs from the normal velocity because it is calculated using the sensitive, "cross-correlation" analysis technique described earlier. This Tg temperature is found by fitting the dashed straight lines 71 and 72 to the deltaVel data on both sides of the knee. Thus, it appears that Tg can be determined more easily from the ultrasound deltaVel than from TMA displacement.

Another important application of ultrasonic monitoring in is the determination of the quality of energetic materials being extruded into propellants grains or pressed into warheads at ammunition defense plants. Extrusion machines are often used to efficiently mix high viscosity components of a powdered solid material dissolved in a solvent (e.g. propellant). Once properly mixed, the materials are extruded through a die to form them into various shapes. In order to produce consistent products, it is important to control the viscosity and porosity of the mixture. The viscosity is primarily determined by the amount of solvent versus solids after extrusion is complete (i.e. component composition). However, an indeterminate amount of solvent is evaporated during mixing and viscosity is difficult to control. Thus, an accurate measurement of the solvent content after extrusion would provide a more consistent product and save costs during manufacture.

The ultrasound spectroscopy method has been used to measure the frequency dependent attenuation and phase velocity in cylindrical sample pellets of extruded propellant material. These samples were provided by the U.S. Army Advanced Research and Development and Engineering Center, Picatinny Arsenal, N.J. The samples were tested as part of a research study involving ultrasonic sensing of extruded material samples.

Although the measurement was not performed in a TMA instrument, the ultrasonic waves passed through the sample in the same way as described above and illustrated in FIG. 5 for inventive TMA instrument 8'. For these measurements, the pitch-catch mode of ultrasonic sensing was used on the approximately ½ inch long samples 10. The sending element 40 was fixed in place against the front face of the sample and the receiving element 55 held against the back face. A wide-band pulse with a center frequency of about 1.5 MHz was emitted by the sending element 40 and traveled through sample 10. The attenuation and phase velocity were calculated from the amplitudes and phases of the received signal as detailed in the equations above.

Since the measurement was not performed in a TMA instrument, temperature was fixed at room temperature of 20° C. Thus, this measuring does not fully illustrate the benefits of the present invention: the combination of TMA and USS readings. However, the example does demonstrate the USS measurements as they would be made in the modified TMA apparatus 8' of this invention.

FIG. 8 shows the measured attenuation versus frequency for propellant samples with three different solvent concentrations. As shown in FIG. 8, the lower the solvent level, the higher the frequency dependent attenuation. This is to be expected because the solids particle concentration is highest in the low solvent sample. A high solid content leads to higher scattering and viscous losses for the ultrasound waves.

Figure 9:
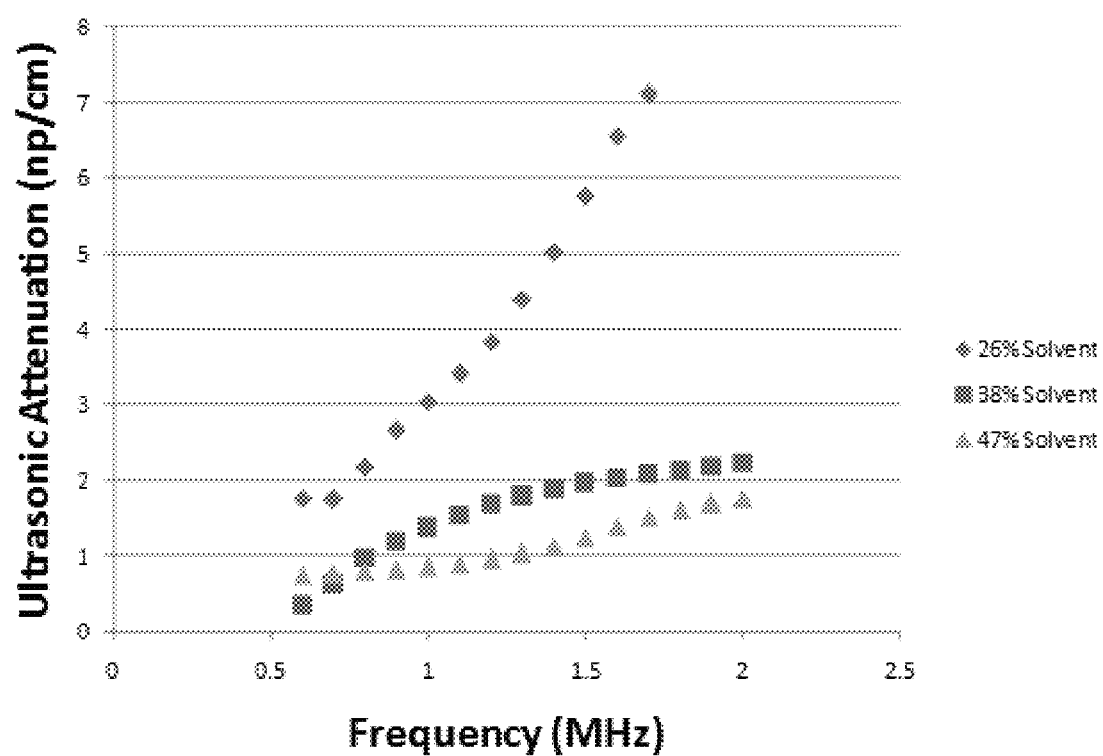
FIG. 9 is a graph of sample ultrasound attenuation readings for three samples of propellant material with different solvent contents.
Figure 10:
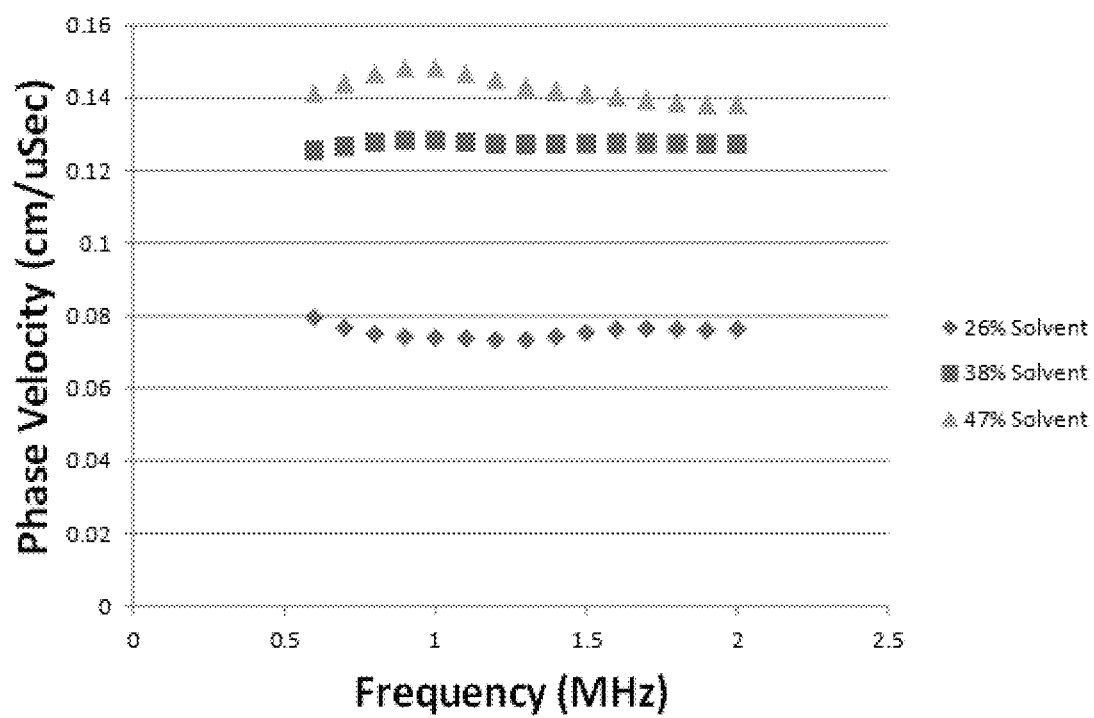
FIG. 10 is a graph of sample ultrasound phase velocity readings for three samples of propellant material with different solvent contents.

Similarly, the phase velocity for the three samples is plotted versus frequency in FIG. 9. The phase velocity appears to be less dependent on frequency than the attenuation. However, the velocity also shows a clear variation with solvent concentration. Based on the variations with solvent level, either the attenuation or velocity or both can be used to predict the solvent level of a new sample. A method which uses velocity to calculate this prediction is described hereinbelow.

To make the solvent concentration measurement from the recorded data, a multivariate linear regression is used with the ultrasound velocity as the X variable and the solvent concentration as the Y variable. From the regression a relation can be used to predict solids percent from the ultrasound data:

$$\text{Solids (\%)}=A+B\times\text{Velocity} \quad [6]$$

where A and B are coefficients calculated by the regression at each frequency. This results in a prediction of solvent concentration at each frequency point. In order to provide a single solvent reading, the results of single frequency points can be compared. Alternatively, the readings can be averaged over all frequencies.

These methods can be used to calculate the solvent content for new samples of extruded propellant from the measured ultrasound signals. As mentioned above, accurate measurement of the solvent content after extrusion would provide a more consistent product and save costs during manufacture. In addition, variations in the attenuation readings would give an indication of quality defects such as porosity because porosity causes increased attenuation due to scattering. By combining these USS measurements with the simultaneous TMA measurements, the present invention provides a powerful technique for characterization of these materials.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a great number of variations of the devices, device components, and method steps set forth in the present description. As will be obvious to one of skill in the art, methods and devices useful for the present methods can include a great number of optional composition and processing elements and steps.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in any composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of," and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A method of characterizing a material, the method comprising:
   (i) placing a sample of a material to be characterized into a thermomechanical analyzer (TMA) instrument, the material sample being a cylindrically- or rectangularly-shaped pellet having parallel top and bottom faces, and the TMA comprising a measurement probe comprising a single buffer rod intermediate an ultrasound transducer and the top face of the material sample;
   (ii) transmitting ultrasound waves through the buffer rod and the top face of the material sample;
   (iii) receiving signals from the ultrasound waves passing through the material sample using a receiving sensor directly below the bottom face thereof;
   (iv) using the TMA instrument to control the temperature and forces applied to the material sample and measuring changing length thereof; and (v) calculating the ultrasonic attenuation and velocity properties of the material as a function of the material sample length measurement and received ultrasound signals.

2. The method of claim 1, wherein the TMA is a commercial instrument having a linear or inverted U-shaped sample rod for dimensional change measurement.

3. The method of claim 1, wherein the receiving sensor is operative at high temperatures of the TMA oven (>200° C.) and has a low coefficient of thermal expansion to avoid confounding the material sample dimensional change measurement.

4. The method of claim 1, wherein the pellet is manually removable and replaceable as needed for repeat measurement.

5. The method of claim 1, wherein the buffer rod and receiving sensor are coupled to the material sample faces by means of high temperature paste or liquid to facilitate easy sample insertion and removal thereof.

6. The method of claim 1, wherein the received signals from the ultrasonic waves provide attenuation and velocity readings at a plurality of frequencies.

7. The method of claim 6, wherein the dimensional change reading from the TMA is used to correct the material sample length for the ultrasonic readings.

8. The method of claim 6, wherein the ultrasound and TMA measurements are combined to provide a characterization of the material.

9. The method of claim 8, wherein multiple ultrasonic waves are emitted into and reflected from the bottom face of the material sample using a pulse-echo ultrasound mode.

10. The method of claim 8, wherein multiple ultrasonic waves are emitted into the material sample and then received using a pitch-catch ultrasound mode.

11. Apparatus for characterizing a cylindrically- or rectangularly-shaped pellet of material, the pellet having parallel top and bottom faces, the apparatus comprising:
(i) a thermomechanical analyzer (TMA) instrument comprising a measurement probe comprising a single buffer rod intermediate an ultrasound transducer and a top face of a material sample;
(ii) means for transmitting ultrasound waves through the buffer rod to the top face of the material sample;
(iii) a receiving sensor in contact with and ultrasonically coupled directly to a bottom face of the material sample;
(iv) apparatus within the TMA instrument to control the temperature and forces applied to the material sample and to measure the changing length thereof; and
(v) means for calculating the ultrasonic attenuation and velocity properties of the material sample as a function of the material sample length measurement thereof.

12. The apparatus according to claim 11, wherein the receiving sensor comprises an ultrasonic emitting and receiving element within the measurement probe proximate the top face of the material sample, the ultrasonic emitting and receiving element receiving waves reflected from the bottom face of the material sample in a pulse-echo ultrasound mode.

13. The apparatus according to claim 11, wherein the receiving sensor comprises an ultrasonic emitting and receiving element within the measurement probe proximate the top face of the material sample, the ultrasonic emitting and receiving element receiving waves reflected from the bottom face of the material sample in a pitch-case ultrasound mode.

14. The apparatus according to claim 11, wherein the receiving sensor, connecting electrodes, and signal transmission cables are operative at high temperature.

15. The apparatus according to claim 11, wherein the ultrasound element comprises a piezoelectric material.

16. The apparatus according to claim 11, wherein the ultrasound element comprises an electromotive acoustic transducer.

17. The apparatus according to claim 11, wherein the ultrasound element has a very low coefficient of thermal expansion.

18. The method of claim 1, wherein material properties of the material sample are measurable, the material properties being chosen from a set thereof consisting of: a coefficient of thermal expansion; a bulk modulus of the material as calculated from velocity; a loss modulus of material as calculated from attenuation; porosity; component concentrations; and particle size.

19. The apparatus according to claim 11, wherein the apparatus can measure material properties of the material sample, the material properties being chosen from a set thereof consisting of: a coefficient of thermal expansion; a bulk modulus of the material as calculated from velocity; a loss modulus of material as calculated from attenuation; porosity; component concentrations; and particle size.

\* \* \* \* \*